United States Patent [19]

Pukari et al.

[11] Patent Number: 5,035,724
[45] Date of Patent: Jul. 30, 1991

[54] SOL-GEL ALUMINA SHAPED BODIES

[75] Inventors: Vimal K. Pukari, Northborough; Norman I. Paille, Jr., Oxford; Thomas P. Thibaudeau, Dudley; Arup K. Khaund, Worcester, all of Mass.

[73] Assignee: Norton Company, Worcester, Mass.

[21] Appl. No.: 521,296

[22] Filed: May 9, 1990

[51] Int. Cl.$^5$ ............................................. B24D 3/02
[52] U.S. Cl. ..................................... 51/309; 501/12; 501/95; 501/127
[58] Field of Search ...................... 51/309; 501/12, 95, 501/127

[56] References Cited

U.S. PATENT DOCUMENTS

| 3,183,071 | 5/1965 | Rue et al. | 51/298 |
| 3,387,957 | 6/1968 | Howard et al. | 51/298 |
| 3,481,723 | 12/1969 | Kistler et al. | 51/298 |
| 3,808,015 | 4/1974 | Seufert | 106/65 |
| 4,314,827 | 2/1982 | Leitheiser | 51/309 |
| 4,543,107 | 9/1985 | Rue | 51/309 |
| 4,574,003 | 3/1986 | Gerk | 51/309 |
| 4,623,364 | 11/1986 | Cottringer et al. | 51/309 |
| 4,786,292 | 11/1988 | Janz et al. | 51/293 |
| 4,883,501 | 11/1989 | Haynes, Jr. | 51/309 |

Primary Examiner—Karl Group
Assistant Examiner—Chris Gallo
Attorney, Agent, or Firm—David Bennett

[57] ABSTRACT

A process for producing dry substantially crack-free shaped bodies, such as grinding wheels, from a sol-gel alumina hydrate composition is disclosed. The shaped bodies are formed by either a one or a two step forming process and avoid having to pre-prepare alpha alumina grits. The addition of specific crack-avoiding drying control additives, e.g. whiskers, chopped fibers, agarose gels, and formamide, to the sol-gel alumina hydrate prior to water removal therefrom substantially prevents crack-formation during the water removal operation.

28 Claims, No Drawings

SOL-GEL ALUMINA SHAPED BODIES

TECHNICAL FIELD

The present invention is directed to the production of shaped bodies from an alumina sol-gel which bodies are substantially free of any visible cracks and maintain the fine microstructure of a conventionally prepared sol-gel abrasive. The substantially crack-free products are particularly useful in the production of grinding wheels by either a one or two step extrusion molding process.

BACKGROUND OF THE INVENTION

The preparation of dense, alumina-based ceramic abrasive grain by sol-gel processes is well known in the art. See, for example, U.S. Pat. Nos. 4,518,397, 4,623,364, 4,744,802 and 4,314,827. Such alumina based ceramic materials are useful as abrasive grains in a variety of products including sand paper, grinding wheels, and other shaped bodies such as monolithic and composite wear components. Vitrified grinding wheels produced from sol-gel grain are known. Shaped bodies formed from sol-gel alumina may be made by a number of different manufacturing techniques including extrusion molding, compression molding, die pressing, and injection molding.

The most economically desirable process for producing sol-gel alumina shaped bodies comprises forming the sol-gel alumina material into a shaped body by a one-step molding process such as an extrusion/injection or an extrusion/compression molding process, or alternatively first forming a multiplicity of small shaped bodies and then compacting them into a desired final shape. Once formed, the shaped body must be dried to remove most of the free moisture from the gelled body prior to final firing. The free moisture removal is necessary because the presence of free water during final firing results in large shrinkage and, more importantly, unacceptable cracking of the body. Thus, the shaped body must be dried to a moisture content of less than about 3.0, preferably less than about 1.0% by weight, before final firing, and the drying must not generate cracks in the shaped body.

However, due to the extremely fine pore structure of the gelled and shaped green body, it is very difficult to remove the water without causing cracking of the shaped body. Some techniques which have been tried to remove the water include controlled humidity drying and atmospheric condition drying by incorporating polymers to prevent cracking. While these techniques do remove the water, they unfortunately also often cause severe cracking of the shaped body and/or require extremely long periods of time, making them impractical and uneconomic.

Because of the cracking problem, abrasive bodies are currently generally formed from sol-gel aluminas by a multi-step process of forming a gel, drying it, crushing the dried gel, sintering the gel particles to form an alpha-alumina grit, mixing the grit with the conventional vitrified or an organic bonding material, pressing the mixture into a desired shape, drying the shape, and firing it at an elevated temperature. The multistep process is time consuming, costly, and, furthermore, the effectiveness of the seeded gel abrasive may not be fully utilized in the presence of the glass bond.

The present invention solves these problems by enabling the production of shaped bodies from an alumina sol-gel by a one or two step process while substantially avoiding the generation of cracks in the dried body.

SUMMARY OF THE INVENTION

According to the present invention shaped bodies, particularly grinding wheels, are formed by suitable processing techniques, particularly a one or two-step extrusion molding process. As defined herein, "extrusion molding" includes those processes known in the molding art including both injection and compression molding. In order to prevent visual cracking of the shaped body so formed, a drying control additive which does not deleteriously effect the fine microstructure of alumina solgel is added to the sol-gel prior to extrusion. Suitable drying control additives ar selected from the group consisting of agarose gels, formamide, and whiskers and chopped fibers of a material which is non-reactive with alumina monohydrate, e.g. a high melting glass or silicon carbide, are added to the alumina sol-gel prior to extrusion. The drying control additives may be added to the sol prior to gelation, or, alternatively, they may be added to the gel after gelation. The alumina sol-gel is shaped to form the desired product, such as a grinding wheel, and the shaped body is dried to remove at least most of the water. While the mechanism which enables the drying control additives to prevent cracking during the drying procedure is not fully understood, it is presently believed that the drying control additives may increase green strength as a result of a mechanical interlocking. The dried body is then fired to form the final product. In the firing step, when high melting glass whiskers or chopped fibers are used as the drying control additive, they may also act as bonding agents for the alumina grains.

DETAILED DESCRIPTION OF THE INVENTION

The alumina-based ceramic material used to make the shaped bodies of the present invention is prepared by a sol-gel process. The process is well known in the art and generally comprises the steps of preparing a sol (dispersion) comprising from about 20 to about 65 weight percent of a hydrated alumina, preferably an alumina monohydrate such as boehmite, which can be prepared by techniques well known in the art or may be obtained from commercial suppliers. The dispersion further includes water and a peptizing agent such as an acid or base to produce a more stable sol. Suitable acids include nitric, hydrochloric, formic, acetic, and perchloric acids. Suitable bases include ammonia, hexamethylene tetramine, and monoethanolamine. The sol may also include up to about 5 to 50 weight % of compatible additives or precursors such as spinel, mullite, manganese dioxide, titania, magnesia, ceria, zirconia powder or a zirconia precursor. These additives are normally included to modify such properties as fracture toughness, hardness, friability, fracture mechanics, or drying behavior.

The sol will also generally include a dispersed submicron crystalline seed material or a precursor thereof in an amount effective to facilitate the conversion of the hydrated alumina particles to alpha alumina upon sintering. Suitable seed materials are well known in the art and include alpha alumina, zirconia, iron, and mullite. The amount of seed material should generally not exceed about 10 weight % (2.7 volume %) of the hydrated alumina and there is normally no benefit to amounts in excess of about 5 weight % (1.35 volume %) Preferably, the seeds are extremely fine, i.e. having a surface area of about 60 m² or more per gram. The seeds may also be added in the form of a precursor thereto such as iron seeds in the form of a ferric nitrate solution. In general, the seed material should be isostructural with alpha alumina and have similar crystal lattice dimension (within about 15%) and be present in the dried gel at the temperatures at which the conversion to alpha alumina will occur (about 1000° to 1100° C.).

The sol containing the materials described above may be formed by any suitable means known in the art. These include mixing, blending, and stirring. The sol may then be gelled by known techniques such as the addition of an acid with dissolved or dispersed metal-containing modifying additive such as magnesium nitrate, the removal of water from the sol, or the like. The resulting material is a sol-gel alumina hydrate.

In addition to the materials which make up a conventional sol-gel, and according to the present invention, a drying control additive which produces non-agglomerated, uniform, sub-micron sized alumina particles is added either to the sol before gelation or to the gel. Suitable such drying control additives include agarose gels, formamide, and whiskers or chopped fibers of a material which is non-reactive with the alumina hydrate. When the drying control additive is added to the sol before gelation it may be mixed into the sol by conventional techniques. When it is added after gelation, high shear mixing or other suitable mixing techniques are likely to be required. It is presently preferred to employ as the drying control additive either an agarose gel or high melting glass or alumina whiskers or chopped fibers.

When the drying control additive is an agarose gel, the gel may be prepared by dispersing an agarose powder in water, preferably hot, i.e. 95° C. or above, water. Suitable agarose is commercially available from FMC Corporation. Generally the agarose will be one having a high gel strength, i.e. above about 200 g/cm² for a 0.5% solution. The agarose concentration in the agarose gel will generally range from about 1 to 10 wt. %, preferably about 3 to 6 wt %. Generally the agarose gel is used in amount of about 1 to about 10 wt. %, preferably about 1 to about 4 wt %, and most preferably about 2 to about 3 wt % based upon the weight of the alumina hydrate.

When formamide is used as the drying control agent it will generally be present in an amount of about 5 to 35 wt % of the weight of the alumina hydrate.

When whiskers or chopped fibers are used as the drying control additive, they are preferably composed of high melting glass or alumina, though a wide variety of other materials such as silicon carbide, alumino-silicate, zirconia, as well as polymers such as polyethylene, polypropylene, and polyester may be used. The whiskers or fibers are generally added in an amount of from about 2 to 30, more preferably about 2 to 10, volume % based upon the sol. The whiskers generally have an aspect ratio of from about 5 to 40, more preferably about 10 to 30, and most preferably about 10 to 20. The chopped fibers generally have an aspect ratio of from about 10 to 200, more preferably about 10 to 100, and most preferably about 10 to 30. If the whiskers or fibers are not of glass they have been found to act a toughening and/or hardening agents. The glass whiskers or fibers also act as a binding agent in the fired shaped body. Mixtures of different whisker or fiber materials may be used.

The sol-gel containing the drying control additive is then formed into a shaped body by any suitable process including pressing, molding, etc. and the body can then be dried without generating cracks during the drying. One preferred process of forming the shaped body entails directly extruding the gel into the shape of the final desired body, i.e. a one-step extrusion molding process. An alternative preferred process entails first extruding the gel as relatively thin "strings" and then pressing the strings into a mold of the desired size and shape, i.e. a two-step extrusion molding process. In either case, the shaped body is then dried by any suitable means at either room or elevated temperature, such as air drying, vacuum drying, or drying in a heated oven, to remove essentially all of the free water. The shaped body is then fired in a conventional manner in a furnace at controlled heating rate. Firing is generally carried out at a temperature of from about 900° to 1500° C. for about 20 to 100 hours, more preferably at about 1000° to 1400° C. for about 30 to 80 hours, and most preferably at about 1100° to 1300° C. for about 40 to 60 hours.

While the process of the present invention is useful in the manufacture of shaped bodies for various end uses including such as refractories, wear and electronic components it is particularly useful in manufacturing abrasive grinding wheels. Accordingly after firing, if such a use is desired, the shaped bodies may be impregnated in a conventional manner with one or more grinding aids, such as molten sulfur, optionally with vehicles, such as epoxy resins, which will carry the grinding aid(s) into the pores of the wheel.

In addition to fillers and grinding aids the abrasive bodies may include one or more additional abrasives in an amount up to about 90% by volume of the total body. The second abrasive may act as a filler as, for example, if it is significantly finer in grit size than the alumina, or as an auxiliary or secondary abrasive if it is about the same size or coarser. In some grinding applications the second abrasive will function as a diluent for the coated sol-gel alumina abrasive grit. In other applications, the second abrasive may even enhance the overall grinding properties of the body, either in overall efficiency or in the finish imparted the ground material. The second abrasive may be a fused alumina, cofused alumina-zirconia, sintered alumina-zirconia, silicon carbide, cubic boron nitride, diamond, flint, garnet, bubble alumina, bubble alumina-zirconia, and the like.

The abrasive bodies produced herein are suitable for grinding all types of metal such as various steels, like stainless steel, cast steel, hardened tool steel; cast irons, for example, ductile iron and modular iron; as well as metals like chromium, titanium, and aluminum.

Due to the incorporation of the drying control additive of this invention, the dried shaped bodies of sol-gel alumina hydrate have essentially no cracks. The absence of cracks in the dried bodies, however, does not preclude the presence of some microcracks around the drying control additives after the final firing, particularly when non-melting whiskers or chopped fibers are used as the additives. By producing the essentially crack-free shaped bodies, the present invention enables the preparation of grinding wheels by a one or two-step process, either of which is substantially less expensive than the current multi-step procedure and results in grinding wheels which are crack-free and durable.

In the following non-limiting examples, all parts and percents are by weight unless otherwise specified.

EXAMPLE I

Two separate substantially identical sol-gel alumina materials are made from the following mixture:

| Ingredient | Wt % | Vol % |
| --- | --- | --- |
| Boehmite | 50.0% | 25.8 |
| Deionized water | 23.2% | 37.2 |
| Seed solution | 10.5% | 16.5 |
| Nitric acid (20% solution) | 10.8% | 16.2 |
| Glass chopped fibers | 5.0% | 3.6 |
| Polizox WSR-205 | 0.5% | 0.7 |

The boehmite is an alumina monohydrate sold under the name Condea Disperal. The seed solution is composed of 3 wt % (0.34 vol %) of $Al_2O_3$ (less than 0.5 micron), balance water. The glass chopped fibers are high melting glass 6 mm in length (avg) and have an aspect ratio ranging between about 50–100. The Polyox WSR-205 is a polyethylene oxide extrusion aid manufactured by Union Carbide.

One batch is extruded into 1" diameter × 12" long rods using a piston extruder with a die opening of approximately 5/8" diameter at an extrusion pressure of approximately 3000 psi.

Another batch is pressed into 3" × ½" thick discs in a die of 3 5/8" diameter at a pressure of 400 psi.

Both the rods and discs are dried in air under ambient conditions. A few pieces of both shapes are also dried at a slower rate by placing them in a perforated plastic bag. Under both drying conditions no visual drying related cracking is observed in any of the samples.

Linear shrinkage of the rods and discs is measured and found to be 23.02% for the rods and 15% for the discs. The rods and discs are then fired at a temperature of 1300° C. for 57.2 hours. Shrinkage is again measured and the rods exhibit a total shrinkage of 40.6% and the discs 24%. Shrinkage is measured by comparing the diameter of the rod or disc samples after drying or after firing with diameter of the die used for extrusion or pressing. These values are an average of two samples each.

The average density after firing (measured according to ASTM C914-79) of the rods was 2.06 g/cc and of the discs 1.81 g/cc.

EXAMPLE II

An alumina monohydrate sol is prepared from 300 g boehmite and 80 g of a 3.8% submicron alpha alumina solution in a high intensity mixer. An agarose gel is prepared by dispersing 3 g of high gel strength agarose powder from FMC Corp. in 60 g hot water (+99° C.) in a high shear mixer. The agarose gel is added to the sol and mixed for 2–3 minutes for homogenization. The resultant sol is gelled by the addition of a solution of 18 g nitric acid in 54 g deionized water.

The gel is extruded through a 0.022" die to produce filaments which are collected in a pan and allowed to air-dry for about 2.5 hours (about 10% moisture removed). Then, about 100 g of the filaments are filled into a mold in the shape of a grinding wheel and pressed with about 5–10 psi. The molded filaments are allowed to air dry at room temperature for 48 hrs. Upon demolding, no cracks are visible on the surfaces of the shaped body.

The grinding wheel-shaped bodies are then fired with the following firing cycle: room temperature to 1000° C. with the temperature increasing at 0.33° C./min; hold at 1000° C. for 15 hours; 1000° C. to 1100° C., increasing at 0.16° C./min; 1100° C. to 1300° C., increasing at 1° C./min; and hold at 1300° C. for 1 hour.

The resultant grinding wheel is crack-free and had a density of 2.95 g/cc, 20% pores, a strength of 2,000 psi, and a Vicker's hardness of 1800 Kgf/mm².

EXAMPLE III

The procedure of Example II is repeated except that the agarose gel is prepared using room temperature water. The resultant grinding wheel shaped body exhibits similar density and strength as in Example II. However, the Vicker's hardness is only 1300–1500 Kgf/mm² and there is a network of macropores as large as 200–300 microns.

EXAMPLE IV

The procedure of Example II is repeated except that the agarose gel is replaced by 45 g formamide. The formamide is added neat to the sol. The resultant shaped body is crack free after the room temperature drying.

EXAMPLE V

The procedure of Example I is repeated except that the gelled alumina hydrate is processed as in Example II by extrusion into filaments which are pressed into a grinding wheel shaped mold. The resultant grinding wheel is crack-free after drying and after firing.

EXAMPLE VI

The procedure of Example I is repeated except that the glass chopped fibers are replaced by chopped fibers of predominantly alpha-alumina of approximately the same size. The resultant dried extrudate is crack-free after drying. After firing some microcracks are present around the fibers. The microcracks may serve as "elongated" pores which may enhance the performance of a grinding wheel.

COMPARATIVE EXAMPLE A

The procedure of Example II is repeated except that the agarose gel is replaced by a fine (0.3–0.4 micron) alpha-alumina powder as the drying control agent. While the powder does reduce the extent of cracking, there are still cracks present and, more importantly, substantial agglomeration and thus lack of uniformity in the final fired body are observed. Thus, the alumina powder is not a suitable drying control agent.

What is claimed is:

1. A method of producing a dry substantially crack-free shaped body from a sol-gel alumina hydrate comprising adding to a sol-gel alumina hydrate prior to the removal of water from the shaped body a drying control additive selected from the group consisting of agarose gel, formamide, and whiskers and chopped fibers of a material which is non-reactive with the alumina hydrate.

2. The method of claim 1, wherein the drying control additive is whiskers or chopped fibers.

3. The method of claim 2, wherein the whiskers or chopped fibers are selected from the group consisting of glass, silicon carbide, alumina, alumino-silicate, and zirconia.

4. The method of claim 2, wherein the whiskers or chopped fibers are present in an amount of from about 2 to 30 volume % of the shaped body.

5. The method of claim 3, wherein the whiskers have an aspect ratio of from about 5 to 40 and the chopped fibers have an aspect ratio of about 10 to 200.

6. The method of claim 2, wherein the whiskers or chopped fibers are added to the sol-gel alumina prior to gelation.

7. The method of claim 1, wherein the drying control additive is an agarose gel.

8. The method of claim 7, wherein the agarose gel is present in an amount of about 1 to about 3 weight % based on the weight of the alumina hydrate.

9. The method of claim 7, wherein the agarose gel is an aqueous dispersion of agarose which has been prepared with hot water.

10. The method of claim 1, wherein the drying control additive is formamide.

11. The method of claim 10, wherein the formamide is present in an amount of about 10 to 20 weight % of the alumina hydrate.

12. The method of claim 1, wherein the shaped body is formed in a one-step combined extrusion molding process.

13. The method of claim 1, wherein the shaped body is formed in a two step process of extrusion followed by molding the extrudates.

14. The method of claim 1, wherein the shaped body is an abrasive grinding wheel.

15. The method of claim 1, wherein the alumina hydrate is an alumina monohydrate.

16. The method of claim 13, wherein the shaped body is fired to convert the alumina hydrate to alpha alumina after the drying has removed the water.

17. A method of forming an alpha-alumina grinding wheel comprising the steps of (1) adding to a sol-gel alumina hydrate a drying control additive selected from the group consisting of agarose gels, formamide, and whiskers and chopped fibers of a material which is non-reactive with the alumina hydrate, (2) forming the sol-gel alumina hydrate gel into the shape of a grinding wheel, (3) removing water from the shape and (4) firing the shape to convert the alumina hydrate into alpha alumina and produce the grinding wheel.

18. The method of claim 17, wherein the forming is by the direct extrusion of the grinding wheel shape.

19. The method of claim 17, wherein the forming is by extrusion of shapes which are then molded into the grinding wheel shape.

20. The method of claim 17, wherein the drying control additive is whiskers or chopped fibers.

21. The method of claim 17, wherein the drying control additive is an agarose gel.

22. The method of claim 17, wherein the drying control additive is formamide.

23. A composition for use in making a dry substantially crack-free alumina hydrate shaped body from which water is removed after formation comprising a sol-gel alumina hydrate, water, and a drying control additive selected from the group consisting of agarose gels, formamide, and whiskers and chopped fibers of a material which is non-reactive with the alumina hydrate.

24. The composition of claim 23, wherein the additive is whiskers or chopped fibers.

25. The composition of claim 24, wherein the whiskers or chopped fibers are selected from the group consisting of glass, silicon carbide, alumina, aluminasilicate and zirconia.

26. The composition of claim 23, wherein the additive is an agarose gel.

27. The composition of claim 23, wherein the additive is formamide.

28. The composition of claim 23, wherein the alumina hydrate is an alumina monohydrate.

* * * * *